Figure 1:
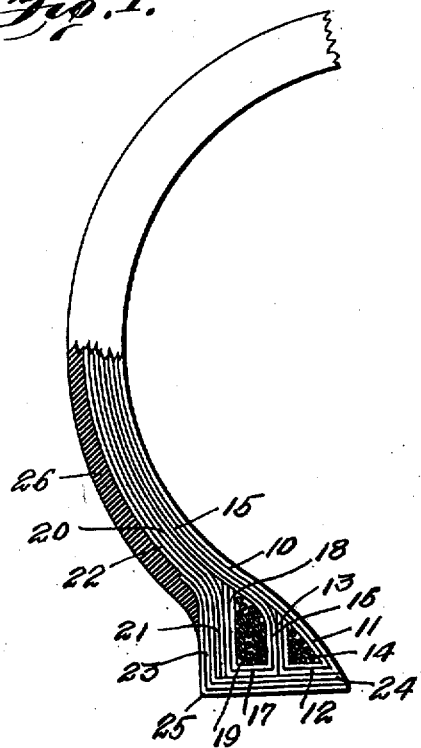

C. L. ARCHER.
CORD TIRE.
APPLICATION FILED FEB. 4, 1922.

1,437,125.

Patented Nov. 28, 1922.

Inventor
C. L. Archer.

Patented Nov. 28, 1922.

1,437,125

UNITED STATES PATENT OFFICE.

CHARLES L. ARCHER, OF DES MOINES, IOWA.

CORD TIRE.

Application filed February 4, 1922. Serial No. 534,090.

*To all whom it may concern:*

Be it known that I, CHARLES L. ARCHER, a citizen of the United States, residing at Des Moines, in the county of Polk and State of Iowa, have invented certain new and useful Improvements in Cord Tires, of which the following is a specification, reference being had therein to the accompanying drawings.

This invention relates to tires and more particularly to pneumatic tires, of cord construction, which are especially adapted for use in connection with motor vehicles.

One object of this invention is the production of a tire, which has its beads so formed as to present a compact and strong construction, thus causing the beads to fit at all times very close to the rim of a wheel, thereby eliminating such troubles as rim cutting.

Another object of this invention is the production of a pneumatic tire, wherein the beads are formed by the provision of a plurality of reinforced looped portions, which carry suitable filling means, thus forming reinforced beads, thereby producing a very strong tire, which may be manufactured at a minimum cost.

One practical form of construction and assembly of the present invention will be hereinafter specifically described and claimed, and is shown in the accompanying drawings, wherein, Fig. 1 is a fragmentary sectional view of the tire.

Referring specifically to the accompanying drawing by numerals, 10 designates an inner ply of cords, which will be hereinafter referred to as the first ply. The end portions of the cords of the first ply 10 converge as shown at 11 and the converging end portions 11 have outwardly extending straight portions 12, which terminate in the straight projections 13 extending at right angles thereto and touching the base of the converging end portions 11, as shown in Fig. 1. The extension of the cords of the first ply 10 in this manner forms the inner hollow looped portions, in which suitable filling means 14 are carried.

A second ply 15 of cords is positioned upon the first ply 10 and the cords of this ply have parallel straight end portions 16 bearing upon the projections 13, thus tending to hold the first-mentioned looped portions in their assembled conditions. The straight end portions 16 have outwardly extending portions 17 terminating the straight projections 18, which extend at right angles to the outwardly extending portions 17 and engage the body portions of the cords of the second ply 15, thus forming hollow looped portions in which are carried suitable filling means 19.

A third ply 20 of cords is positioned upon the second ply 15 and the end portions 21 of the cords of the third ply 20 are straight and parallel and bear upon the projections 18 of the second ply 15, thus holding the outer second mentioned looped portions in their assembled conditions.

A fourth ply 22 of cords is positioned upon the third ply 20, and the end portions 23 of the cords of this ply are parallel and straight and bear upon the end portions 21 of the cords of the third ply 20 and the end portions of the cords of the fourth ply 22 terminate in the inwardly extending projections 24. It will be noted that the outwardly extending portions 12 and 17 are in alignment with each other and the projections 24 therefore fit snugly thereupon, thus reinforcing the two looped portions in the bead upon each side of the tire.

A fifth ply 25 of cords is positioned upon the projections 24 of the fourth ply and extends to a point adjacent the base of the parallel straight portions 23, for reinforcing the bead upon each side of the tire. A tread 26 of any suitable construction may be positioned upon the fourth ply 22. While in this form of the present invention the construction of only one bead is set forth, it is not deemed necessary to show the construction of the remaining bead, since the construction at each side of the tire is identical.

In general, the preferred form of the present invention (Fig. 1) is constructed and assembled by looping over the end portions of cords and placing suitable filling means in the looped portions and in addition by providing another ply of cords having end portions reinforcing the outer side portions or projections of one looped portion in each bead and the addition of another ply of cords having straight end portions reinforcing the end portions of the last-mentioned ply and the provision of projections upon the fourth ply which fit upon the looped portions for reinforcing the same. It will be seen that a tire constructed in accordance with the present invention will include beads of a reinforced and solid construction, which will not lose their shape when in use and for this reason will hold the tire firmly upon the rim of a wheel and will prevent such tire troubles as rim cutting.

It has been found from actual experience, in the manufacture of tires similar in construction to the invention and the embodiment thereof, as set forth in this case, that reinforced beads are provided. The looped portions carrying the filling means also provide very solid beads, which facilitate the retention of the tire very firmly in its correct position upon a wheel, without the tire losing its shape when undergoing severe strain, while the eliminating of such troubles as rim cutting will tend to lengthen the life of the tire.

While only one form of the present invention has been shown and described, it is obvious that minor changes may be made in the construction of the invention without departing from the spirit of the invention, as long as the changes do not exceed the scope of the invention as claimed.

Having described the present invention, what is claimed as new is:—

In a tire of the character described, the combination of a ply of cords having outwardly looped end portions, a second ply of cords having outwardly looped end portions, whereby a pair of looped portions are formed in each bead of the tire, the looped portions of the second ply bearing upon the looped portions of the first ply, thereby holding the looped portions of the first ply in looped condition, a third ply of cords positioned upon the second ply and the end portions of the cords of the third ply being parallel and straight and bearing upon the looped portions of the second ply, thereby holding the last-mentioned looped portions in looped condition, filling means carried within said looped portions, a fourth ply of cords having parallel straight end portions bearing upon the parallel straight end portions of the third ply, the parallel straight end portions of the fourth ply terminating in inwardly extending projections fitting upon the looped portions for reinforcing the same, as and for the purposes set forth.

In testimony whereof I hereunto affix my signature.

CHARLES L. ARCHER.